(No Model.)

C. COERPER.
ALTERNATING CURRENT MOTOR.

No. 527,195. Patented Oct. 9, 1894.

WITNESSES:

INVENTOR
Carl Coerper
BY
ATTORNEYS.

UNITED STATES PATENT OFFICE.

CARL COERPER, OF COLOGNE, GERMANY.

ALTERNATING-CURRENT MOTOR.

SPECIFICATION forming part of Letters Patent No. 527,195, dated October 9, 1894.

Application filed May 15, 1894. Serial No. 511,304. (No model.)

*To all whom it may concern:*

Be it known that I, CARL COERPER, a citizen of the German Empire, and a resident of Cologne, Germany, have invented certain new and useful Improvements in Alternating-Current Motors, of which the following is a specification.

It is well-known that an iron disk applied to a rotary shaft, is rotated by the influence of alternating magnetic poles when the latter are properly arranged toward the same. The iron disk exerts, however, but a comparatively small power, and does not run at synchronous speed. It rotates sometimes somewhat quicker, but oftener slower than the speed which corresponds to the "synchronous speed" of the same.

By "synchronous speed" is meant the speed which corresponds exactly to the same or half the numbers of rotations corresponding to the number of changes of the poles. If, for instance, the generator has sixty poles and is run with one hundred rotations per minute, the current-receiver or motor has to make with twenty poles three hundred or one hundred and fifty rotations per minute, when the same has to exert a tractive force. It is well known that this is not the case with motors in which a so-called phase-shifting takes place, as in these motors a decrease of speed takes place when a load is put on, so that a perfect synchronism cannot be obtained. These defects are fully obviated by my improved alternating current-motor, which comprises an unwound sheet-iron armature provided with radial arms and field-magnets every two adjacent poles of which act simultaneously on adjacent ends of the armature, as will be fully described hereinafter and finally pointed out in the claim.

Figure 1:
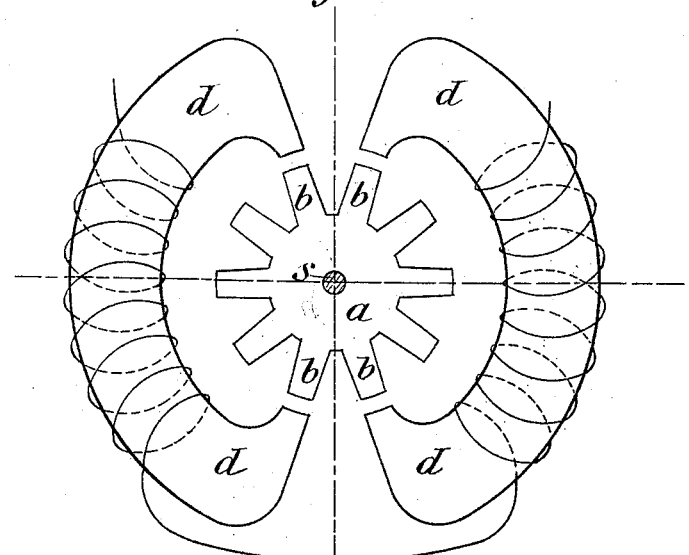
Figure 2:
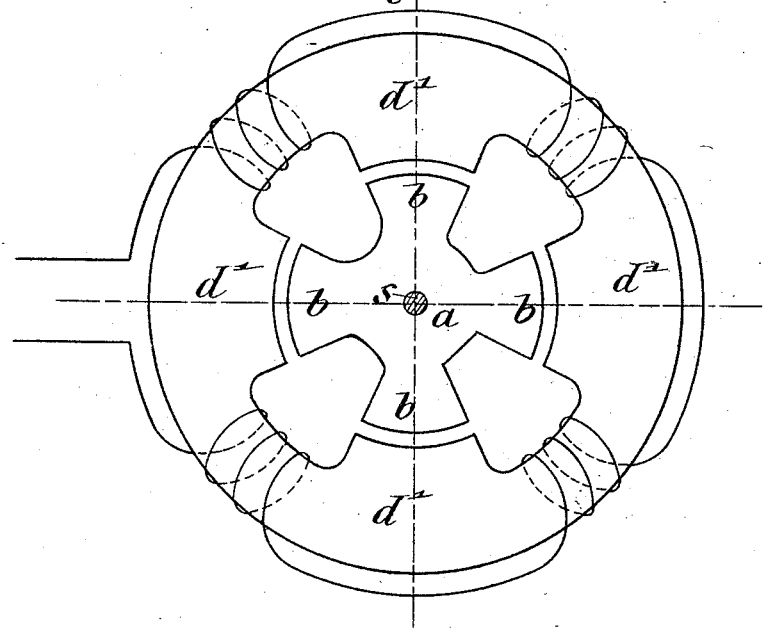

In the accompanying drawings, Figures 1 and 2 represent two different forms of my improved alternating current-motor.

Similar letters of reference indicate corresponding parts.

Referring to the drawings, $a$ is an armature, which is made of a piece of sheet-iron or of a number of sheet-iron pieces, which are connected so as to form an armature having radial arms. The armature $a$ is mounted on a rotary shaft $s$, which passes through the center of the same. Two adjacent arms $b, b$, of the armature $a$ are always under the influence of opposite and alternating poles of the field-magnets $d, d$. As soon as the armature is rotated at synchronous speed with the generator, it exerts considerable tractive force and keeps up a speed corresponding exactly with the alternating changes of the current. Instead of arranging two separate field-magnets, as in Fig. 1, a closed field-magnet $d'$ $d'$ may be used, as shown in Fig. 2, in which four pole-faces are formed and in which all the radial arms of the armature are simultaneously subjected to the influence of the alternately changing polarities of the pole-faces. The form of the armature, as well as the form of the field-magnets has to be adapted for the purposes for which the motor is to be used. Any other arrangement of field-magnets may be made, and also the field-magnets arranged at the center and the armature outside of and around the same, as I do not wish to confine myself to the special construction shown in the drawings.

For a proper explanation of the synchronous speed of the armature, it is not necessary to explain the same in connection with the well-known theory of "phase-shifting," but it can be explained in a much simpler manner, by the following reasoning:—When, in the magnetic field, shown in Fig. 2, alternating polarities are formed, opposite polarities are induced in the radial arms of the star-shaped armature. When the pole-changes in the magnetic field follow slowly one after the other, the armature can follow the same and consequently the armature will not be set in motion. As soon, however, as the changes of polarity in the magnetic field follow each other in such quick succession, that the magnetism induced in armature is still active, even while the change of currents has induced other polarities in the field, there must be a certain repulsion between the magnetic force induced in the field and the uniform polarity of the armature, while simultaneously the adjacent opposite pole-face of the field exerts an attraction on the armature. When therefore the current-receiver or motor is made to run at synchronous or semi-synchronous speed, the armature passes always with full force from the even pole-spaces of the field to the uneven pole-faces of the same. It depends thereby on the number of pole-changes, on the strength of the magnetic field, and on the quantity of iron in the armature whether the full synchronous or the semi-synchronous speed yields the most favorable action of the motor.

Having thus described my invention, I claim as new and desire to secure by Letters Patent—

In an alternating current motor, the combination of an armature provided with unwound radial arms, and field magnets comprising two semi-circular sections having inwardly projecting poles at the ends thereof, every two adjacent poles of which act simultaneously on adjacent arms of the armature, substantially as described.

In testimony that I claim the foregoing as my invention I have signed my name in presence of two subscribing witnesses.

CARL COERPER.

Witnesses:
    FRITZ SCHRÖDER,
    F. BAUMEISTER.